US008914963B2

(12) United States Patent
Ntavos et al.

(10) Patent No.: US 8,914,963 B2

(45) Date of Patent: Dec. 23, 2014

(54) MOUNTING STATION AND METHOD FOR AUTOMATICALLY ASSEMBLING A RAZOR

(75) Inventors: Vasileios Ntavos, Ilion (GR); Georgios Koulourias, Marousi (GR)

(73) Assignee: BIC-Violex S.A., Attiki (GR)

( * ) Notice: Subject to any disclaimer, the term of this patent is extended or adjusted under 35 U.S.C. 154(b) by 89 days.

(21) Appl. No.: 13/498,222

(22) PCT Filed: Oct. 8, 2009

(86) PCT No.: PCT/EP2009/063126

§ 371 (c)(1), (2), (4) Date: May 14, 2012

(87) PCT Pub. No.: WO2011/042060

PCT Pub. Date: Apr. 14, 2011

(65) Prior Publication Data

US 2012/0216388 A1 Aug. 30, 2012

(51) Int. Cl.

| | |
|---|---|
| ***B25B 27/02*** | (2006.01) |
| ***B25B 27/14*** | (2006.01) |
| ***B23P 19/04*** | (2006.01) |
| ***B23P 11/00*** | (2006.01) |
| ***B23P 21/00*** | (2006.01) |
| ***B23P 19/00*** | (2006.01) |
| ***B26B 21/40*** | (2006.01) |
| *B23Q 3/00* | (2006.01) |

(52) U.S. Cl.

CPC .................................. *B26B 21/4075* (2013.01)

USPC ................... 29/453; 29/225; 29/428; 29/429; 29/430; 29/464; 29/466; 29/281.1; 29/281.5; 29/700; 29/822; 29/787

(58) Field of Classification Search

CPC .......... B23P 19/04; B23P 19/00; B23P 19/02; B23P 19/10; B23P 11/00; B23P 11/02; B23P 21/00; B23P 2700/50; B25B 27/14; B25B 31/00; B25B 27/0035; B25B 27/30; B21D 39/03; B21D 53/64; B21D 53/645; B23Q 3/00; B26B 19/384; B26B 21/54

USPC ........... 29/225, 700, 783, 822, 429, 430, 453, 29/464, 466, 468, 787, 281.1, 281.5, 428; 30/50, 526–536, 223, 346.51; 76/DIG. 8, 116, 82, 401.1

See application file for complete search history.

(56) References Cited

U.S. PATENT DOCUMENTS 3,596,340 A 8/1971 Costa 3,785,051 A * 1/1974 Dawidowicz et al. ......... 30/40.2

(Continued)

FOREIGN PATENT DOCUMENTS

| | | |
|---|---|---|
| GB | 2 411 141 A | 8/2005 |
| JP | 2000-326151 | 11/2000 |
| WO | WO 2007/002055 A1 | 1/2007 |

OTHER PUBLICATIONS

International Search Report (PCT/EP2009/063126).

*Primary Examiner* — Essama Omgba

*Assistant Examiner* — Darrell C Ford

(74) *Attorney, Agent, or Firm* — Jones Day

(57) ABSTRACT

A mounting station for automatically assembling a razor that includes a shaving cartridge and a razor handle. The mounting station includes providing a razor handle and a shaving cartridge, automatically connecting a first rearwardly protruding connector of the shaving cartridge to the free end of the first handle connector of the razor handle, and then automatically connecting the second rearwardly protruding connector of the shaving cartridge to the free end of the second handle connector of the razor handle to form a razor.

7 Claims, 12 Drawing Sheets

(56) References Cited

U.S. PATENT DOCUMENTS

| | | | | |
|---|---|---|---|---|
| 3,833,146 | A * | 9/1974 | Braginetz | 221/66 |
| 3,861,019 | A | 1/1975 | Choate et al. | |
| 3,864,896 | A | 2/1975 | Bailey, Jr. | |
| 3,866,298 | A | 2/1975 | Nowak | |
| 3,880,284 | A * | 4/1975 | Pomfret | 206/354 |
| 3,941,244 | A * | 3/1976 | Braginetz | 206/360 |
| RE29,571 | E * | 3/1978 | Dawidowicz et al. | 30/40.2 |
| 4,139,940 | A * | 2/1979 | Buras et al. | 30/43.92 |
| 4,266,340 | A * | 5/1981 | Bowman | 30/532 |
| 4,978,031 | A * | 12/1990 | Lembke | 221/102 |
| 5,347,171 | A | 9/1994 | Cordoba et al. | |
| 5,522,137 | A * | 6/1996 | Andrews | 30/50 |
| 5,946,805 | A * | 9/1999 | Oldroyd | 30/40.2 |
| 6,161,288 | A * | 12/2000 | Andrews | 30/50 |
| 6,164,290 | A * | 12/2000 | Andrews | 132/215 |
| 7,152,512 | B1 | 12/2006 | Prochaska | |
| 7,823,272 | B2 * | 11/2010 | Guay et al. | 29/820 |
| 2002/0184770 | A1 * | 12/2002 | Peyser | 30/50 |
| 2003/0213130 | A1 * | 11/2003 | Motta | 30/50 |
| 2004/0049921 | A1 * | 3/2004 | Freas et al. | 30/223 |
| 2006/0080839 | A1 * | 4/2006 | Hesketh | 30/50 |
| 2011/0010929 | A1 * | 1/2011 | Guay et al. | 29/705 |
| 2012/0047743 | A1 * | 3/2012 | Kemos et al. | 30/32 |

* cited by examiner

MOUNTING STATION AND METHOD FOR AUTOMATICALLY ASSEMBLING A RAZOR

CROSS REFERENCE TO RELATED APPLICATION

This application is a national stage application of International Application No. PCT/EP2009/063126 filed on Oct. 8, 2009, the entire contents of this application are incorporated herein by reference.

FIELD OF INVENTION

The embodiments of the present invention relate to the manufacture of a wet shaving razor.

BACKGROUND OF THE INVENTION

In particular, the embodiments of the present invention are related to a method for automatically assembling a razor that includes a shaving cartridge and a razor handle, the shaving cartridge having first and second rearwardly protruding connectors and the razor handle having first and second handle connectors which have free ends adapted to be connected respectively to the rearwardly protruding connectors and to a mounting station for automatically assembling such a razor.

Generally, the wet shaving razors are manufactured in assembling a razor handle and a shaving cartridge together on an assembly line, especially in case of disposable razor for which the sold razor comprises a razor handle already attached on a shaving cartridge.

To connect a razor handle on such a shaving cartridge, the first and second rearwardly protruding connectors of the shaving cartridge are usually simultaneously connected to the free ends of the first and second handle connectors of the razor handle.

Therefore, a high stress is applied to each of these rearwardly protruding connectors and to the free ends to allow, generally by snap-fitting or snap-pressing, meaning by elastic deformation of the element, during the connection.

This high stress can lead to the creation of burrs on the protruding connectors reducing or eliminating the pivoting motion of shaving cartridge. This high stress can also lead to the breakage of the rearwardly protruding connectors and/or of the free ends, leading to the scrapping of the razor before shipping or more annoying to the breakage of the razor when used by the consumer.

SUMMARY OF THE EMBODIMENTS OF THE PRESENT INVENTION

To this aim, a method and a mounting station are provided to improve the manufacture of the razor and the reliability of the razor during its use.

To this end, according to the invention, the method includes:

- a handle providing step wherein the razor handle is provided,
- a cartridge providing step wherein the shaving cartridge is provided,
- a first connecting step wherein the first rearwardly protruding connector of the shaving cartridge is automatically connected to the free end of the first handle connector of the razor handle, and
- a second connecting step wherein the second rearwardly protruding connector of the shaving cartridge is automatically connected to the free end of the second handle connector of the razor handle, thereby forming a razor.

The manufacture of the whole razor is improved since the second rearwardly protruding connector of the shaving cartridge is connected to the free end of the second handle connector of the razor handle after the first rearwardly protruding connector of the shaving cartridge is connected to the free end of the first handle connector of the razor handle. Therefore, there is less stress applied on the rearwardly protruding connectors and on the free ends of the razor handle and the lifetime of the connection between the razor handle and the shaving cartridge is improved.

There is therefore a guarantee that the pivoting function is not lost or malfunctioning and also less risk of breakage of the connection between the razor handle and the shaving cartridge during the use of the razor by the consumer, especially for a disposable razor for which there is no need to change the dulled shaving cartridge, the whole razor being thrown away.

In various embodiments of the invention, one and/or the other of the following features may be incorporated in this method alone or in mutual combination:

- during the second connecting step the second rearwardly protruding connector of the shaving cartridge is snap-pressed against the free end of the second handle connector of the razor handle;
- during the handle providing step, the razor handle is transported from a handle arriving zone where the razor handle is provided to a connecting zone where the two rearwardly protruding connectors of the shaving cartridge are connected to the free ends of the razor handle,
- during the cartridge providing step, the shaving cartridge is transported from a cartridge arriving zone where the shaving cartridge is provided to the connecting zone, and
- a razor transporting step wherein, after the second connecting step, the razor is transported from the connecting zone to a receiving zone;
- a dragging step occurring between the first and second connecting steps and during which the razor handle slidingly drags the shaving cartridge, the razor handle being slid from the first connecting step to the second connecting step.

The embodiments of the present invention are also directed to a mounting station for automatically assembling a razor comprising a shaving cartridge and a razor handle, the shaving cartridge having first and second rearwardly protruding connectors and the razor handle having first and second handle connectors which have free ends adapted to be connected to the rearwardly protruding connectors, the mounting station comprising a handle support adapted to carry a razor handle and a cradle adapted to carry a shaving cartridge, the cradle being adapted and being controlled to connect firstly and automatically the first rearwardly protruding connector of the shaving cartridge to the free end of the first handle connector of the razor handle and to connect secondly and automatically the second rearwardly protruding connector of the shaving cartridge to the free end of the second handle connector of the razor handle, thereby forming a razor.

In various embodiments of the present invention, one and/or the other of the following features may be incorporated in this mounting station:

- further comprising a handle synchronizing mechanism, a handle conveyor provided with the handle support and a retaining mechanism adapted to retain a razor handle onto the handle support during the connection of the rearwardly protruding connectors of the shaving cartridge to the free ends of the razor handle, the handle synchronizing mechanism synchronizing the retaining mechanism and the handle conveyor;

the retaining mechanism is simultaneously movable with the handle conveyor during the connection of the rearwardly protruding connectors of the shaving cartridge to the free ends of the razor handle;

further comprising a cartridge conveyor and a cartridge synchronizing mechanism, the cradle being movable between a receiving position in which the cradle is adapted to receive a razor cartridge carried by the cartridge conveyor and an connecting position in which the shaving cartridge carried by the cradle can be connected onto a razor handle, the cartridge synchronizing mechanism synchronizing the cartridge conveyor and the cradle, the cartridge and handle synchronizing mechanisms being synchronized together;

the cradle comprises a ramp such that in the receiving position, the shaving cartridge can slide from the cartridge conveyor on the ramp to be carried by the cradle and in the connecting position, the cartridge can be dragged from the ramp by the handle;

the ramp is inclined between a top and a bottom such that in the receiving position, the first rearwardly protruding connector of the shaving cartridge is located on the top, whereas the second rearwardly protruding connector of the shaving cartridge is located on the bottom.

BRIEF DESCRIPTION OF THE DRAWINGS

Other characteristics and advantages of the embodiments of the present invention will readily appear from the following description of its embodiments, provided as non-limitative examples, in reference to the accompanying drawings.

In the drawings.

On the different Figures, the same reference signs designate identical or similar elements.

DESCRIPTION OF PREFERRED EMBODIMENTS OF THE INVENTION

Figure 1:
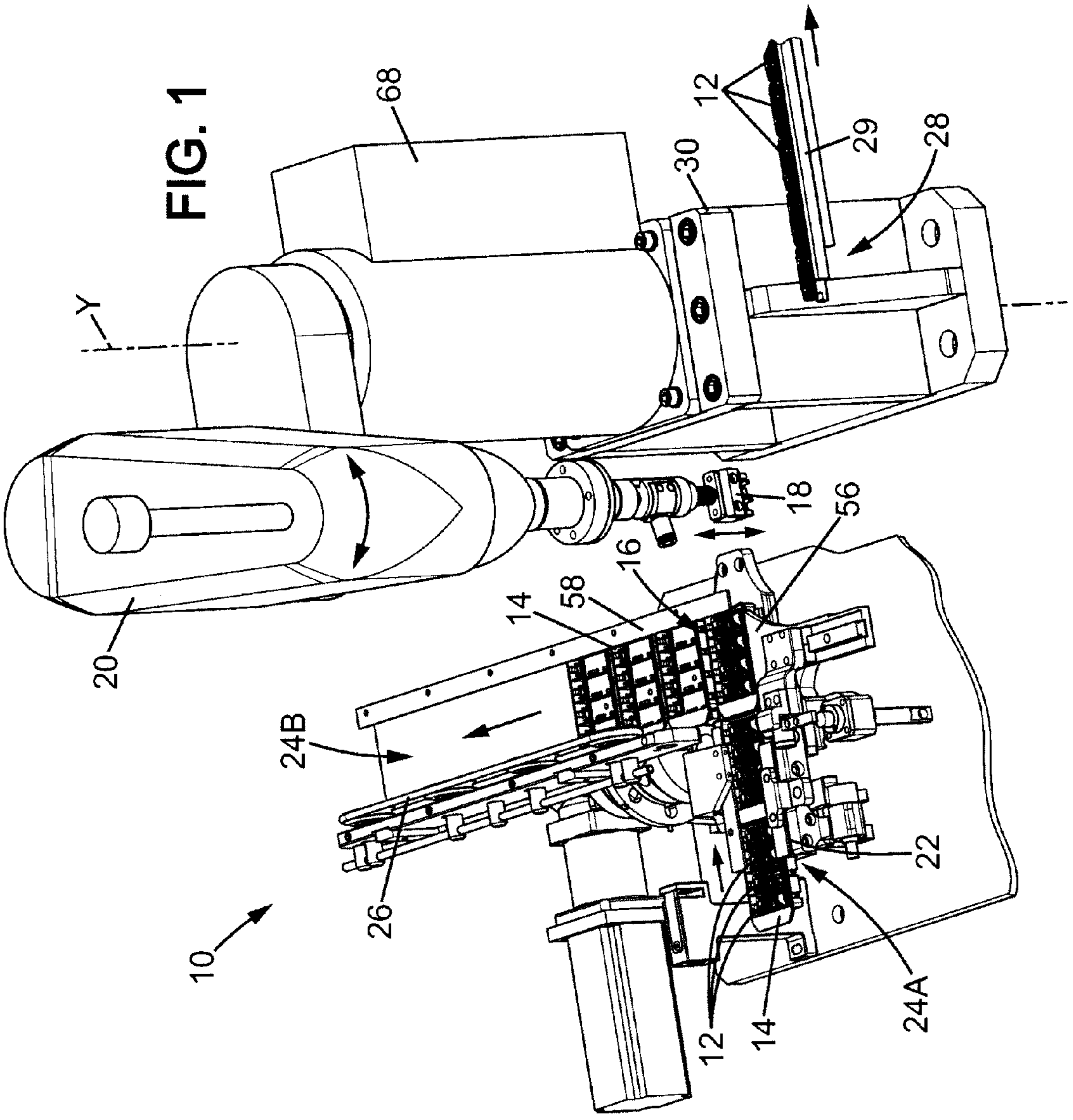
FIG. 1 is a schematic perspective view of a device for automatically removing a shaving cartridge contained in a cartridge dispenser.

FIG. 1 illustrates a device 10 for automatically removing a shaving cartridge 12 contained in a cartridge dispenser 14 previous to its connection to a razor handle (as detailed hereinafter). The cartridge dispensers 14 are previously filled, for example, with four shaving cartridges 12. The shaving cartridges 12 have one or more shaving blades (not illustrated).

A first tool 18 mounted on a turret 20 provided on the device 10 will empty each cartridge dispenser 14 provided in a dispenser arriving zone 16.

Actually, the cartridge dispensers 14 are preferably transported by a first dispenser conveyor 22 from a departure zone 24A where they arrive preferably completely full of shaving cartridges 12 to the dispenser arriving zone 16 where they are emptied one after another.

When the cartridge dispenser 14 is completely empty, it is preferably transported to an evacuation zone 24B where it can be collected for instance to be refilled, etc. A second dispenser conveyor 26 can be provided to transport the emptied cartridge dispensers 14 from the dispenser arriving zone 16 to the evacuation zone 24B.

Since the cartridge dispenser has to be maintained in the dispenser arriving zone 16 as long as it is not completely emptied, at least one of the first and second dispenser conveyors is preferably not a continuous one, but rather a step by step one.

In order to gain place, the first 22 and second 26 dispenser conveyors can be placed transversally to each other as depicted on FIG. 1.

The filled cartridge dispensers 14 can be put on the first dispenser conveyor 22 with an interval or preferably side by side, for instance in mutual contact or in close proximity along their greater side. When the second dispenser conveyor 26 is placed transversally to the first one, the emptied cartridge dispensers 14 may be located side by side along their smaller side. Of course other configurations especially of the dispenser conveyors, can be imagined without departing from the scope of the invention.

The turret 20 is adapted to remove one shaving cartridge 12 contained in a cartridge dispenser 14 located in the dispenser arriving zone 16 and then place the shaving cartridge 12 removed from the cartridge dispenser 16 in a cartridge release zone 28 where they can be directly put on a cartridge conveyor 29 for connection to a razor handle (not illustrated) or stocked for further connection or other use.

To this end, the turret 20 is pivotably mounted on a frame 30 between a first position in which the first tool 18 can catch the shaving cartridge 12 contained in the cartridge dispenser 14 to a second position in which the first tool 18 can release the shaving cartridge 12 to the cartridge release zone 28.

Figure 2:
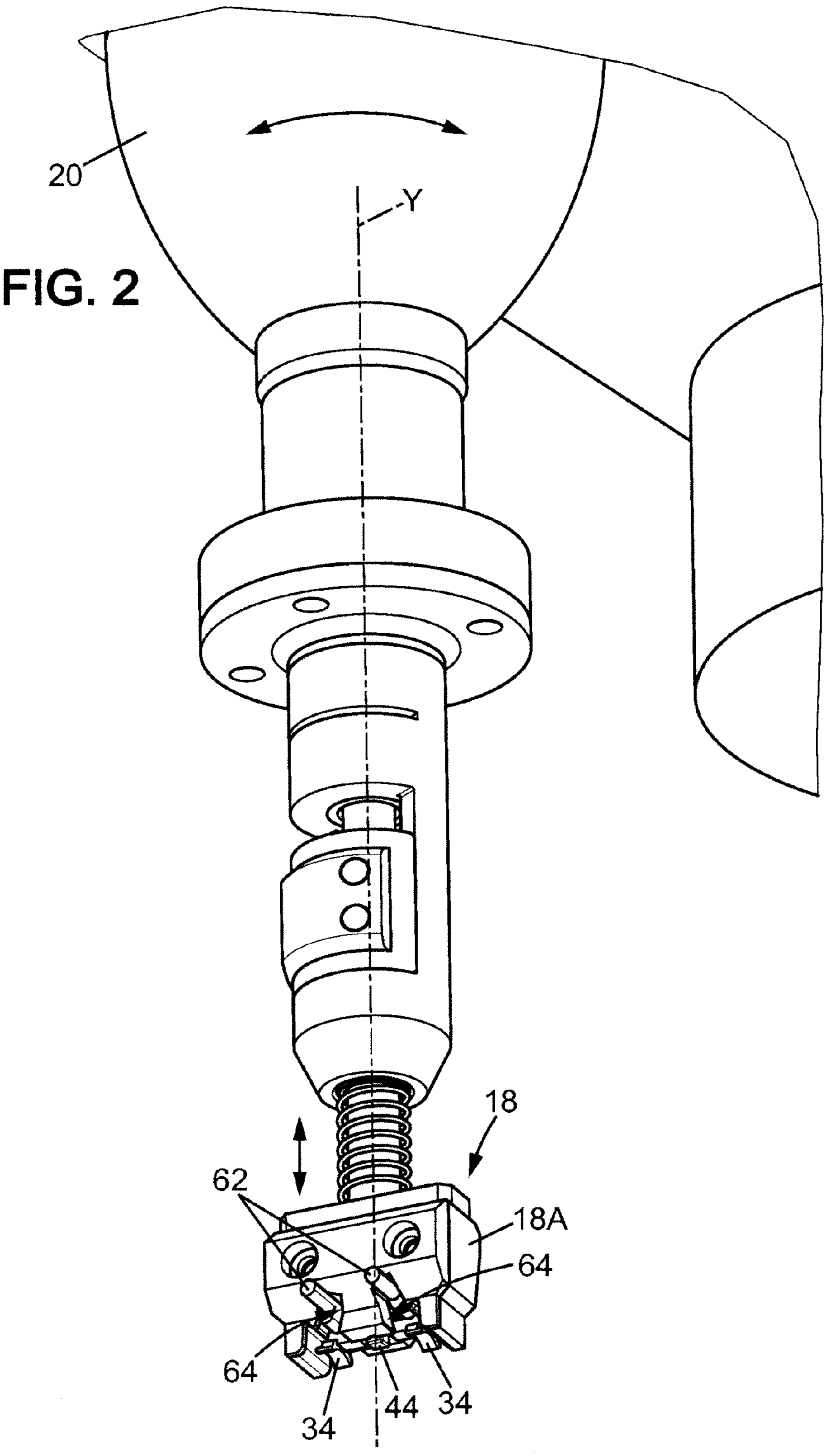
FIG. 2 is a perspective view of a first tool provided on the device of FIG. 1.

As depicted on FIG. 2, the first tool 18 is preferably slidingly mounted on the turret 20 such that it can slide between an upper position corresponding to the transport of the shaving cartridge 12 and a lower position in which it can catch and/or release the shaving cartridge 12.

A synchronising mechanism (not illustrated) can be provided to synchronize the displacement of the first 22 and second 26 conveyors, the rotation of the turret 20 and the translation of the first tool 18.

Figure 3:
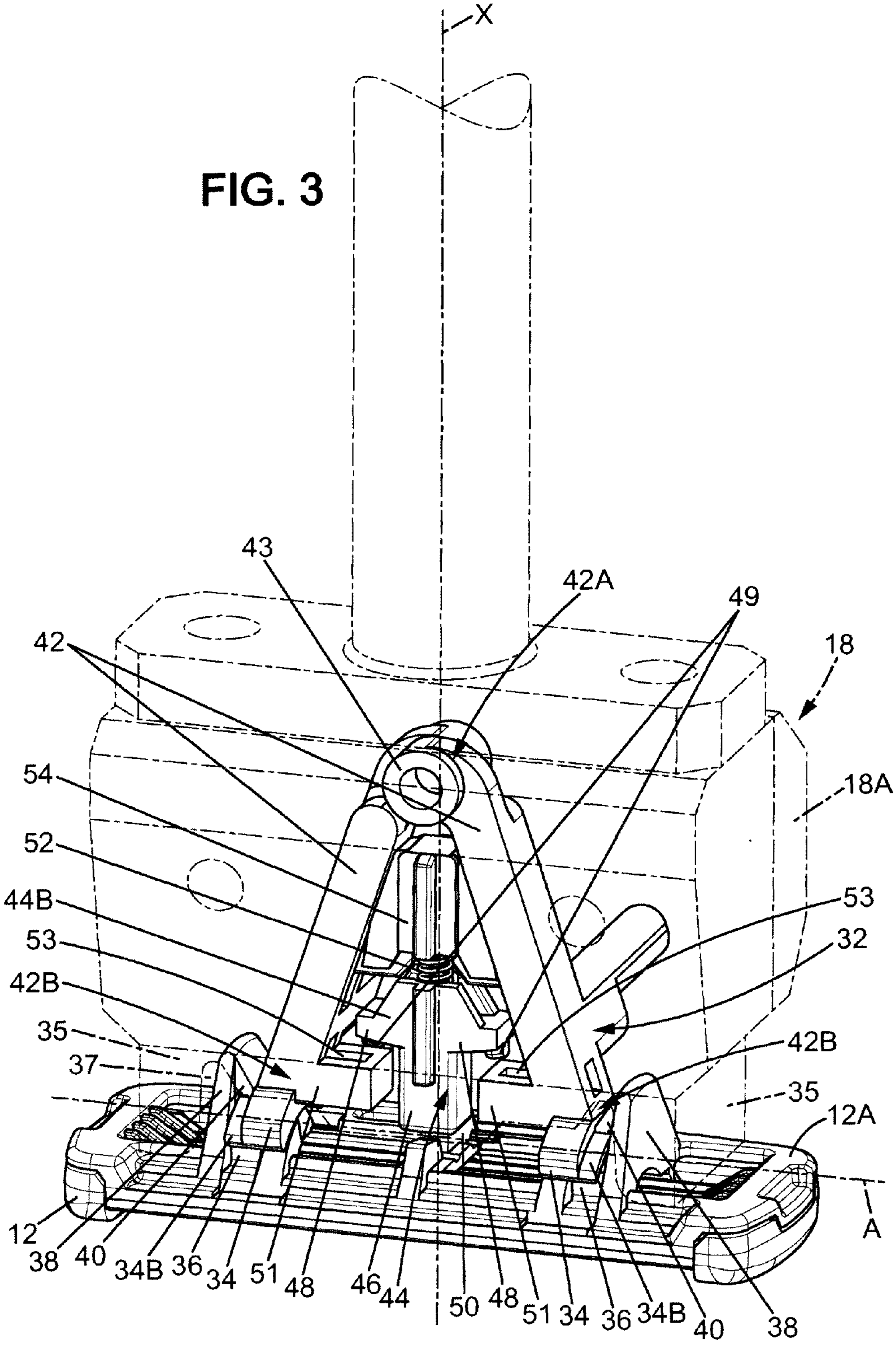
FIG. 3 is a perspective side view of the first tool of FIG. 2 connected to a shaving cartridge.
Figure 4:
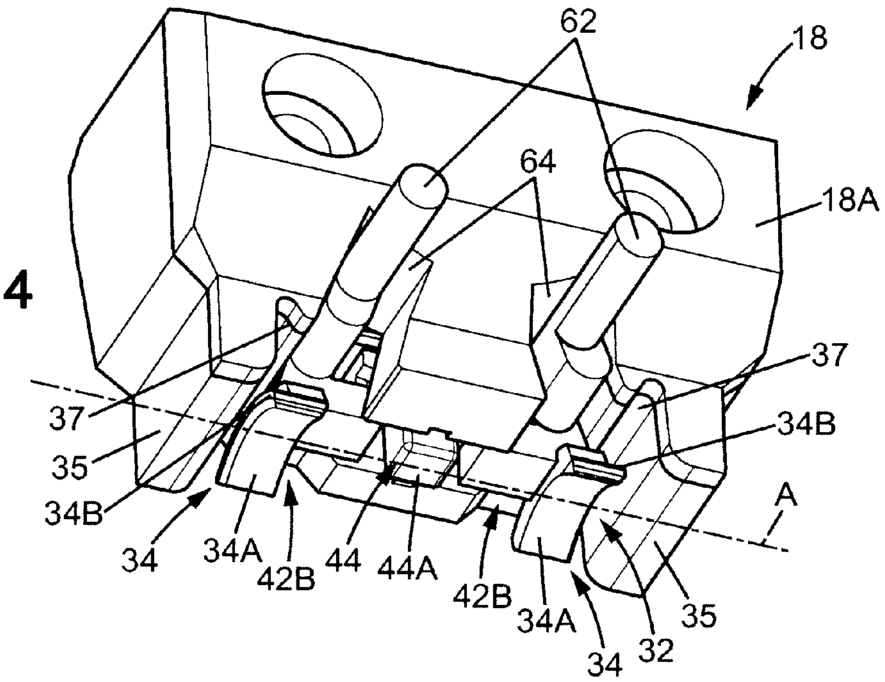
FIG. 4 is a perspective lower view of the first tool of FIG. 2.

The first tool 18 is provided with a gripper 32, as better depicted on FIGS. 3 and 4. The gripper 32 is adapted to grip a shaving cartridge 12. When the shaving cartridge 12 is for instance provided with a shell-bearing connection, the gripper 32 can be provided with shell-bearings 34.

As well-known, the shell-bearing connection may be provided on the rear face 12A of the shaving cartridge 12 (opposite to the blade edges—not illustrated) with two rearwardly protruding connectors, i.e. two inwardly facing arcuate slots 36. These arcuate slots 36 may be formed respectively in two protruding ribs 38 and two respective inclined surfaces 40 facing each other and extending slantwise toward each other from the top of the ribs 38 toward the arcuate slots 36.

Therefore, to remove such a shaving cartridge 12 from a cartridge dispenser 14, the shell-bearings 34 of the gripper 32 may be shaped in correspondence with the arcuate slots 36 and ribs 38 to be received in them.

Actually, the gripper 32 may include two arms 42 which can be made for instance out of metal or molded plastic material. The two arms 42 may each extend from a first end 42A situated inside a tool body 18A (in dashed lines on FIG. 3) toward a free end 42B which may protrude toward the outside of the tool body 18A. The two arms 42 may be disposed in a V shape, diverging from a medial axis Y from their first end 42A toward their respective free end 42B. The first ends 42A of the two arms 42 may be connected together by a hinge 43 connecting the two arms 42 to each other.

The free ends 42B of the arms 42 may be provided with the respective two shell bearings 34 which are exposed toward the outside. As explained previously, the free ends 42B could also be provided with journal means or any known connecting means according to the connecting means provided on the shaving cartridge.

Each shell bearing 34 may for instance include a cylindrical concave front face 34A and a lateral edge 34B which protrudes outwardly and which has also a cylindrical shape. The two front faces 34A and the two lateral edges 34B have the same cylindrical axis, corresponding to the pivot axis A of rotation of the shaving cartridge 12.

Two lateral flanges 35 can further be provided on the tool body 18A forming a protecting skirt over the two front faces 34A and the two lateral edges 34B to protect them especially of any involuntary shock which could damage the gripper 32.

In reference to FIGS. 3 and 4, the arms 42 are elastically biased opposite to one another toward a cartridge locking position (see FIG. 3) and movable toward one another into a cartridge release position (see FIG. 4).

The arcuate slots 36 can receive the lateral edges 34B for connecting the shaving cartridge 12 onto the gripper 32. Each of the two lateral flanges 35 of the tool housing 18 may be provided with a recess 37 opening forward and adapted to receive partially the two protruding connectors of the shaving cartridge 12. Therefore, after connection to the shaving cartridge 12, the two lateral flanges 35 cover at least a part of the ribs 38 especially to protect them from any damage which could occur.

As best illustrated on FIG. 3, the gripper 32 further includes a plunger 44 which is movably mounted, substantially along the medial axis Y between the two arms 42. This plunger 44 has a central body 46 and two lateral external wings 48 extending opposite to one another toward the two arms 42; each lateral external wings 48 being provided with a pin 49 extending forward. The central body 46 extends longitudinally parallel to the medial axis Y, between a first, substantially flat free end 44A which bears against a cam surface 50 provided on the shaving cartridge 12, and a second end 44B facing away from the shaving cartridge 12. Each of the arms 42 is further provided with a lateral internal wing 51 provided with a recess 53 adapted to receive the pin 49 of the external wings 48 of the plunger 44.

Since the shaving cartridge 12 is in pivotal connection with the gripper 32 about pivot axis A, the plunger 44 is further elastically biased by a helicoidal spring 52 toward the cam surface 50 of the shaving cartridge 12 so as to cooperate therewith by camming action. Thus, the shaving cartridge 12 is biased in rotation about pivot axis A toward a rest position in which the shaving cartridge can no longer pivot.

An arm pusher 54 is slidably mounted between the arms 42 in line with the plunger 44 along the medial axis Y. More specifically the arm pusher 54 is disposed between the plunger 44 and the hinge 43 along the medial axis Y and is elastically biased by the spring 52 toward the turret 20, i.e. away from the shaving cartridge 12.

The arm pusher 54 cooperates by camming action with the two arms 42 for biasing the arms 42 outwardly away from each other, toward the cartridge locking position shown in FIG. 3, where the lateral edges 34B of the shell bearings 34 penetrate in the corresponding arcuate slots 36 of the shaving cartridge 12.

The same spring 52 is used to bias the plunger 44 elastically toward the cam surface 50 of the shaving cartridge 12 and to bias the arm pusher 54 away from the shaving cartridge 12, thus biasing both the shaving cartridge 12 in rotation toward the rest position and the arms 42 toward the shaving cartridge lock position.

In the cartridge release position, the pins 49 of the plunger 44 stay inserted in the corresponding recesses 53 of the arms 42 until the next cartridge is picked up and the plunger 44 bears again against the cam surface 50, the arms 42 going again outwardly away from each other toward the shaving cartridge lock position.

Since the shaving cartridge 12 can be retained in the cartridge dispenser 14 especially when the last is provided with cartridge retaining means, the device 10 can be further provided with a retaining mechanism allowing the removing of the shaving cartridge from a cartridge dispenser without the cartridge dispenser. More precisely, the first dispenser conveyor 22 can be provided with one or two lateral guide 56 extending along the length of the first dispenser conveyor 22 or at least a part of it maintaining the cartridge dispensers 14 on the first dispenser conveyor 22 without preventing the transport. The second conveyor 26 can also be provided with a lateral 58 which partly cover the upper surface of at least the cartridge dispenser 14 located in the dispenser arriving zone 16, without covering any of the shaving cartridges 12 contained in it.

Figure 5:
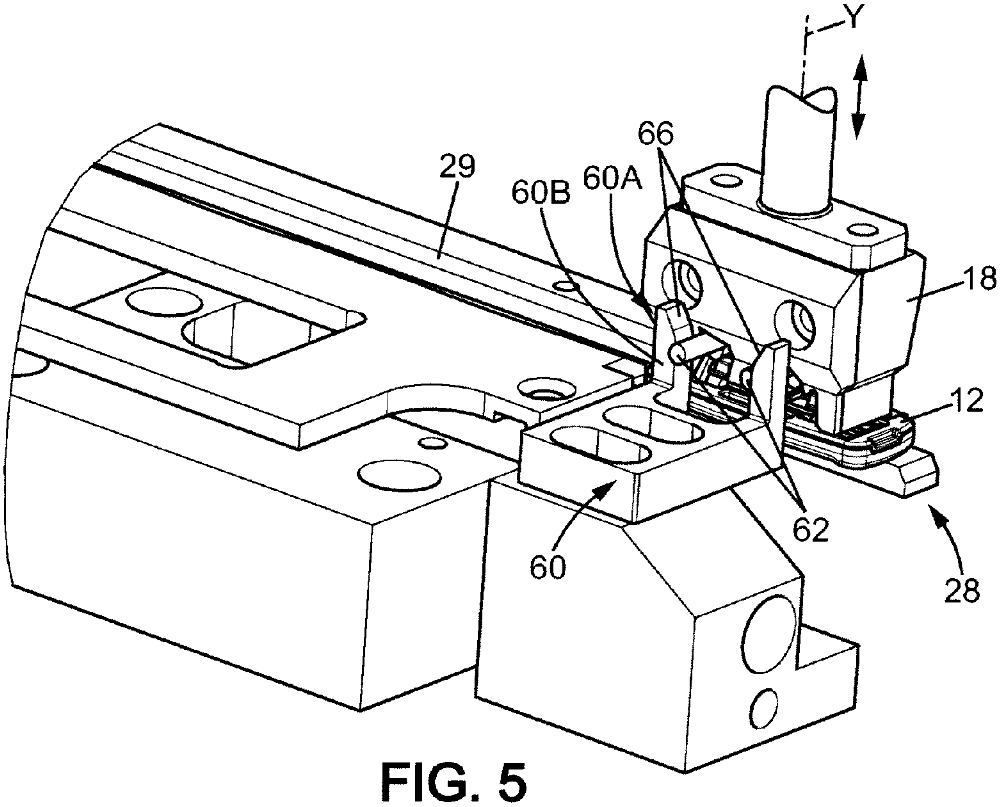
FIG. 5 is a perspective view of the first tool of FIG. 2 in another position.

In order to release a shaving cartridge 12 caught by the gripper 32, the device 10 further comprises a release mechanism 60 as depicted on FIG. 5 adapted to cooperate with the gripper 32 to release the shaving cartridge 12 from the gripper 32.

The two arms 42 of the first tool 18 further include respectively two pins 62 which may be formed integrally therewith and which may protrude laterally out of the tool body 18, for instance through two recesses 64 formed in the tool body 18 as best depicted on FIGS. 2 and 4.

The release mechanism 60 which is located in the cartridge release zone 28 is adapted to act on the pins 62, thereby passing the arms 42 from the cartridge locking position to the cartridge release position.

More specifically, the release mechanism 60 comprises two inclined camming surfaces 66 facing each other and extending slantwise toward each other from the top 60A of the release mechanism 60 toward the bottom 60B of the release mechanism 60. When the gripper 32 is slid down in the cartridge release zone 28, the pins bear against the inclined camming surfaces 66, compelled to move toward each other, thereby releasing the shaving cartridge 12 connected to the gripper 32.

Figure 6:
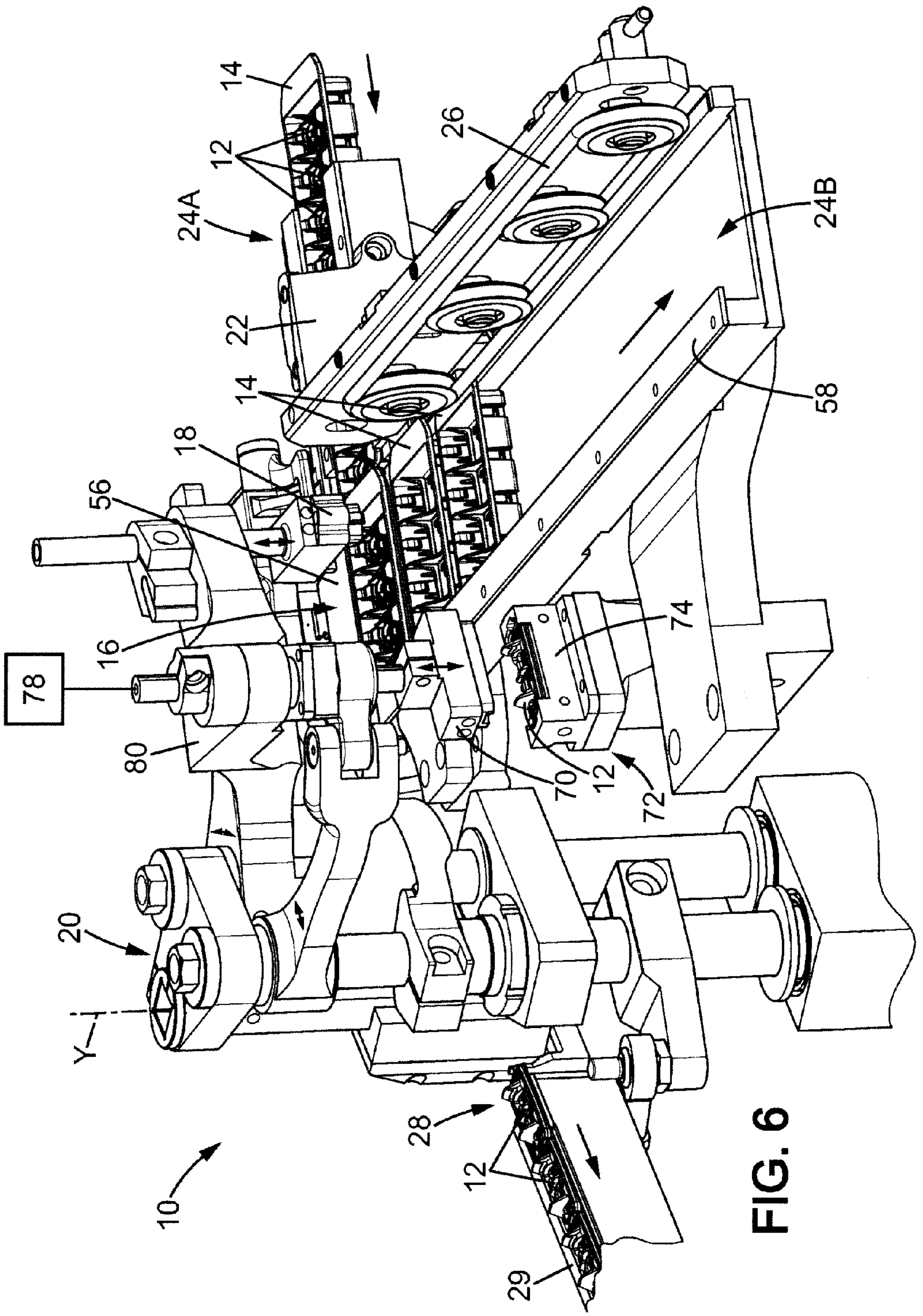
FIG. 6 is a schematic perspective view of a device for automatically removing a shaving cartridge contained in a cartridge dispenser according to another embodiment.

The device illustrated on FIG. 1 comprises a turret 20 controlled by a robot 68 and can therefore easily pivot directly from the dispenser arriving zone 16 to the cartridge release zone 28. FIG. 6 illustrates another embodiment, in which no robot is provided.

Since no robot is provided and in order to gain space, the device 10 for automatically removing a shaving cartridge contained in a cartridge dispenser according to this other embodiment, further comprises a second tool 70 slidingly mounted on the turret 20 between an upper position corresponding to the transport of the shaving cartridge 12 and a lower position in which it can catch and/or release the shaving cartridge 12.

The first tool 18 is pivotable between the dispenser arriving zone 16 and an intermediate zone 72, whereas the second tool 70 is pivotable between the intermediate zone 72 and the cartridge release zone 28.

Figure 7:
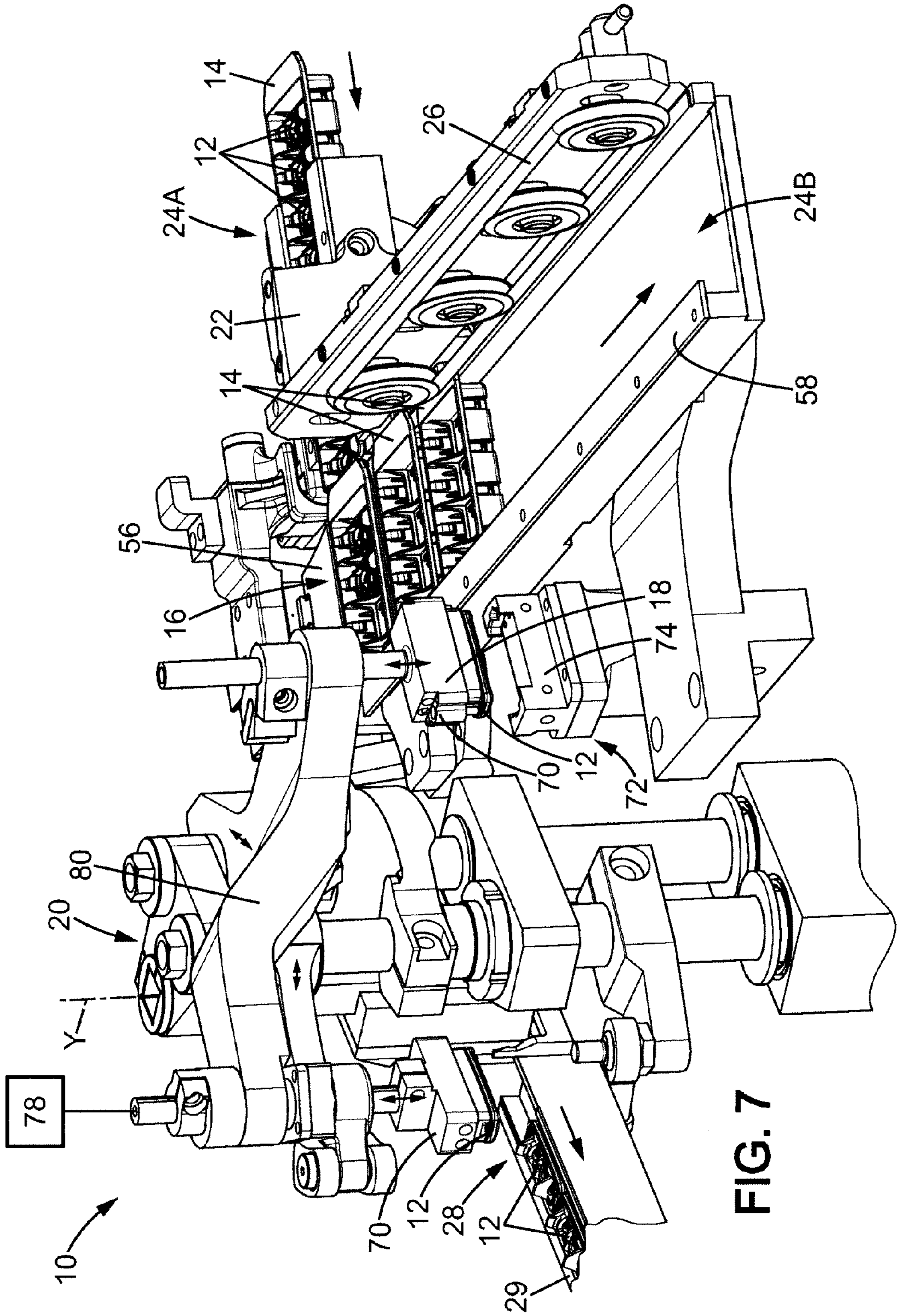
FIG. 7 is a schematic perspective view of the device of FIG. 6 in another position.
Figure 8:
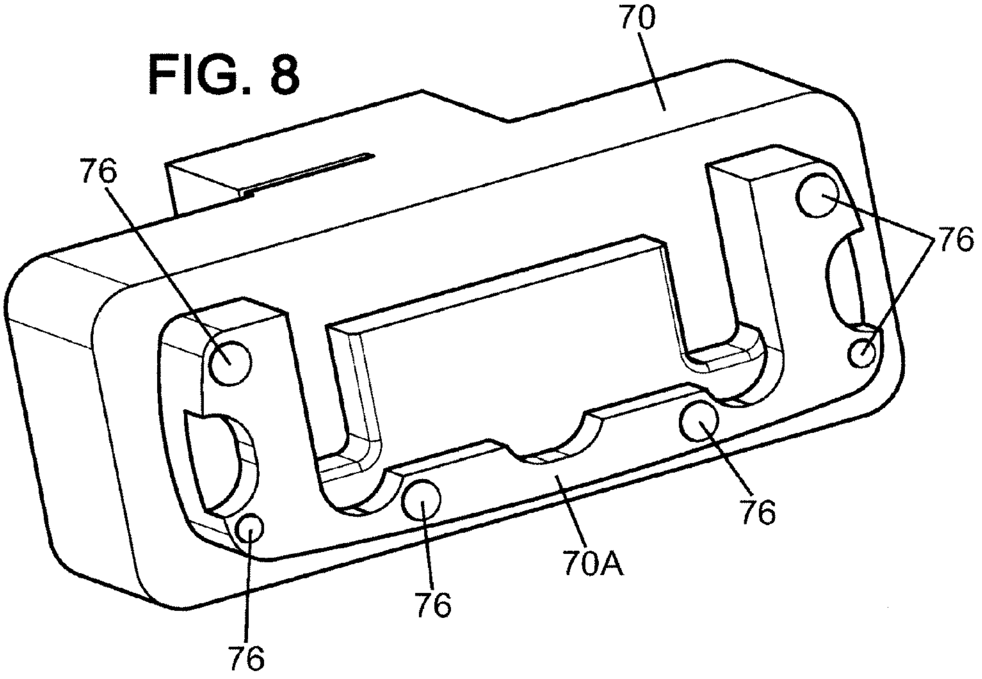
FIG. 8 is a perspective lower view of a second tool provided on the device of FIG. 7.

The first tool 18 provided for the other embodiment depicted on FIGS. 7 and 8 is preferably exactly the same as that disclosed before, whereas the second tool 70 is different. The device here can also be provided with a retaining mechanism 56 and/or with a release mechanism (not illustrated on FIGS. 7 and 8) as disclosed before. Of course, since the first tool 18 covers only a part of the displacement (from dispenser arriving zone 16 to the intermediate zone 72), the release mechanism is not located in the cartridge release zone 28, but in the intermediate zone 72.

Actually, in this intermediate zone, a shaving cartridge 12 removed from a cartridge dispenser 14 located in the dispenser arriving zone 16 can be deposited on an intermediate support 74 preferably motionless and located between the dispenser arriving zone 16 and the cartridge release zone 28.

The intermediate support 74 is geometrically adapted to the shape of the shaving cartridge 12, especially the shape of its rear face 12A such that the shaving cartridge 12 cannot fall down from the intermediate support 74.

Departing from this intermediate position, the shaving cartridge 12 can be caught by the second tool 70 and placed in the cartridge release zone 28. As better depicted on FIG. 8, the second tool 70 is provided with holes 76 connected via vacuum ducts (not illustrated) to a vacuum supply 78. These holes 76 are spread evenly on the face 70A of the second tool 70 which is in contact with the shaving cartridge 12. The shape of this face 70A is of course adapted to fit with the shape of the shaving cartridge 12.

A synchronizing mechanism comprising among other things a connecting arm 80, is further provided to synchronize the pivoting and sliding motions of the first 18 and second 70 tools such that when the first tool 18 is in the position to remove a shaving cartridge 12 from a cartridge dispenser in the dispenser arriving zone 16, the second tool 70 is in position to remove the shaving cartridge 12 supported on the intermediate support 74.

For instance, as depicted on FIGS. 6 and 7, when the first tool 18 is located in the dispenser arriving zone 16, the second tool 70 is located in the intermediate zone 72, whereas when the first tool 18 is located in the intermediate zone 72, the second tool 70 is located in the cartridge release zone 28.

Besides, both first 18 and second 70 tools can be simultaneously in their respective upper position and then in their lower position.

The method for automatically removing a shaving cartridge contained in a cartridge dispenser will now be described.

At least one cartridge dispenser 14 containing at least one shaving cartridge 12 is provided in a departure zone 24A. The first dispenser conveyor 22 continuously transports the filled cartridge dispenser 14 to the dispenser arriving zone 16 where the first tool 18 has been pivoted to. As soon as the first dispenser conveyor 22 arrives in the dispenser arriving zone 16, the first tool 18 is slid down in its lower position along a vertical axis, corresponding to the axis Y. When the gripper 32 arrives in contact with the shaving cartridge 12, the plunger 44 is pressed against the cam surface 50; the pins 49 of the plunger 44 are thereby released from the corresponding recesses 53 of the arms 42, the arms 42 going outwardly away from each other, the shell-bearings 34 being inserted in the rearwardly protruding connectors 36, thereby connecting the shaving cartridge 12 to the gripper 32 in the shaving cartridge lock position. The shell-bearings 34 are therefore simultaneously and smoothly inserted in the rearwardly protruding connectors 36 to avoid any damage on the shaving cartridge 12.

Alternatively, the device 10 may further comprise a mechanism, for instance a pneumatic one (not illustrated on the drawings), which can control the motion of the arms 42 to bring them m in their cartridge release position and to move them outwardly away from each other just after their contact with the rearwardly protruding connector 36 of the shaving cartridge 12.

Alternatively, the device 10 may further comprise another release mechanism, analogous to the release mechanism 60 as depicted on FIG. 5 adapted to cooperate with the gripper 32 to bring the arms 42 in their release position prior their contact with the rearwardly protruding connector 36 of the shaving cartridge 12. The shaving cartridge 12 can thus be smoothly gripped by the gripper 32, the shell-bearings 34 being inserted in the rearwardly protruding connector 36 while the arms 42 are moved outwardly away from each other just after their contact with the rearwardly protruding connector 36 of the shaving cartridge 12.

As soon as the gripper 32 is connected to the shaving cartridge 12, the first tool 18 is slid in its upper position and then pivoted about the vertical axis Y to the intermediate zone 72. Since the cartridge dispenser 14 is retained on the first dispenser conveyor 22 it is not dragged with the shaving cartridge 12 which can therefore remove from it.

When arriving in the intermediate zone 72, the first tool 18 is slid down along the vertical axis Y in its lower position to release the connected shaving cartridge 12 and place it on the intermediate support 74.

As the pins 62 arrive in contact with the inclined camming surfaces 66 of the release mechanism 60, since the first tool continues to slide down, they are brought together. The arms 42 are thus brought in their release position and the shaving cartridge 12 is released from the gripper 32 and received on the intermediate support 74.

The first tool 18 is then slid upward along the vertical axis Y in its upper position and pivoted about the same axis to return in the dispenser arriving zone 16.

During the rotation of the first tool 18 from the intermediate zone 72 to the dispenser arriving zone 16, the second tool 70 is also rotated about the vertical axis Y from the cartridge release zone 28 to the intermediate zone 72.

When the second tool 70 arrives in the intermediate zone 72 it is slid down along the vertical axis Y in its lower position and as soon as the face 70A of the second tool 70 reaches the rear face 12A of the shaving cartridges 12 located on the intermediate support 74, the vacuum supply 78 is started and the shaving cartridge 12 is fixed to the second tool 70 by suction. The second tool 70 is then slid upward along the vertical axis Y in its upper position and pivoted about the same axis to return in the cartridge release zone 28.

The second tool 70 is then slid down along the vertical axis Y in its lower position to place the connected shaving cartridge 12 on the cartridge conveyor 29.

During the rotation of the second tool 70 from the intermediate zone 72 to the cartridge release zone 28, the first tool 18 is also rotated about the vertical axis Y from the dispenser arriving zone 16 to the intermediate zone 72. These steps are repeated as long as the cartridge dispenser 14 contains a shaving cartridge 12; as soon as it is completely emptied, the cartridge dispenser 14 is transported by the second dispenser conveyor 26 from the dispenser arriving zone 16 to the evacuation zone 24B.

Another filled cartridge dispenser 14 is moved forward by the first dispenser conveyor 22 to the dispenser arriving zone 16 and the same steps as above-described occur.

For manufacturing a wet shaving razor, such shaving cartridges 12 removed from cartridge dispensers 14 can thereafter be connected to a shaving razor handle.

Such a device 10 for automatically removing a shaving cartridge contained in a cartridge dispenser can be integrated in an apparatus for manufacturing a razor further comprising a mounting station 82 for automatically assembling a razor comprising a shaving cartridge and a razor handle as depicted on FIGS. 9-12. More precisely, the mounting station 82 is adapted to attach in a connecting zone 88, the shaving cartridge 12 removed from the cartridge dispenser 14 onto a razor handle 84 to form a razor 86.

The mounting station 82 includes a handle conveyor 92 that includes a handle belt 92A shaped with handle supports 90 each adapted to carry a razor handle 84. More precisely, each razor support 90 is preferably shaped such that it can receive and maintain the rear face 84A of the razor handle 84 while it is transported by the handle belt 92A. The handle belt 92A is movable along horizontal axis X in a back and forth movement. The handle conveyor 92 further comprises a lifter 92B able to lift sensibly along axis Y a razor handle 84 from one handle support 90 to the next handle support 90.

The combination of the vertical motion of the lifter 92B and the horizontal motion of the handle belt 92A leads to a continuous transport (i.e. at a same speed along F92) of the razor handles 84 from a handle arriving zone 94 to a receiving zone 96 (after connection to a shaving cartridge).

Figure 9:
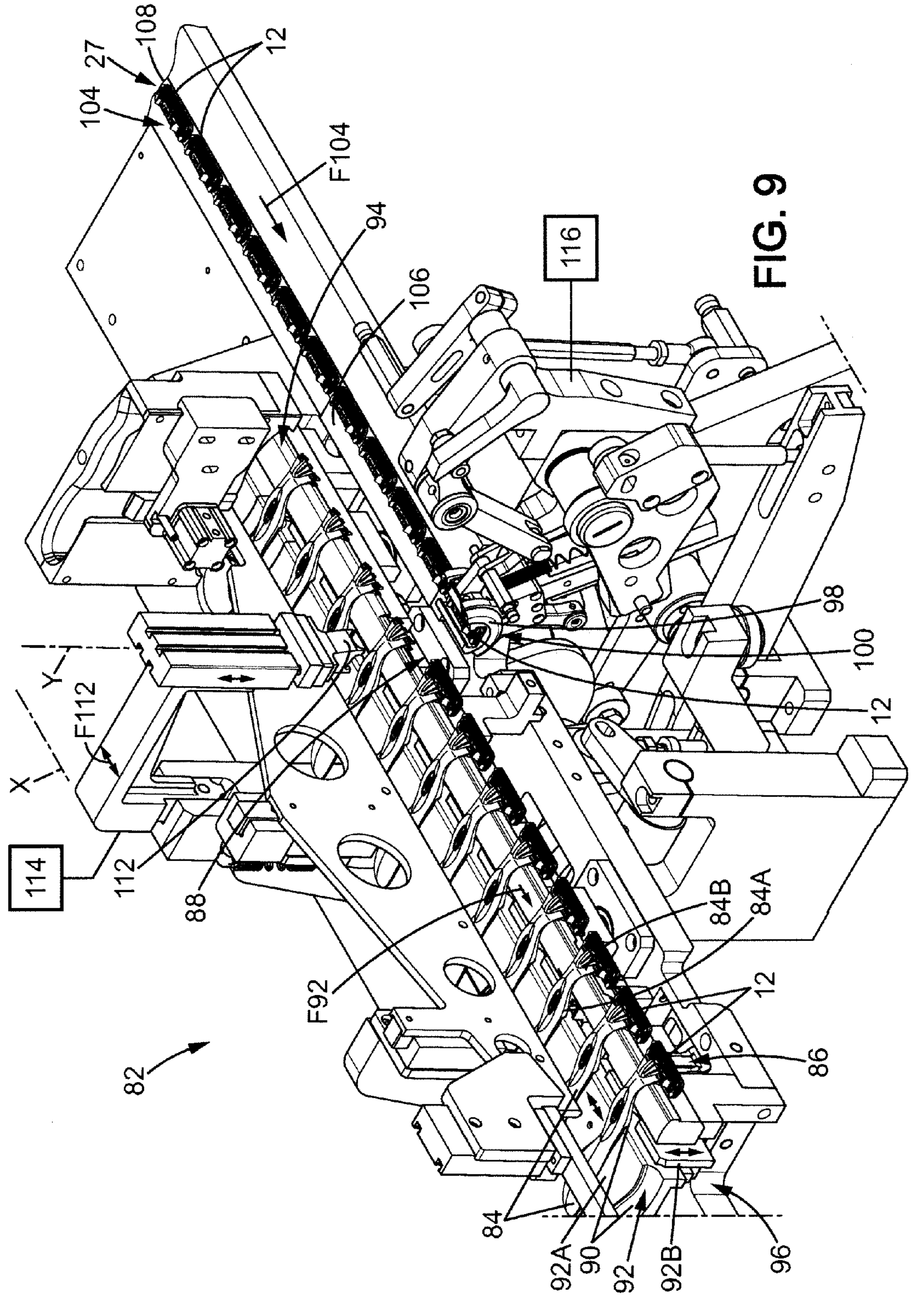
FIG. 9 is a schematic perspective view of an apparatus for automatically assembling a razor.
Figure 10:
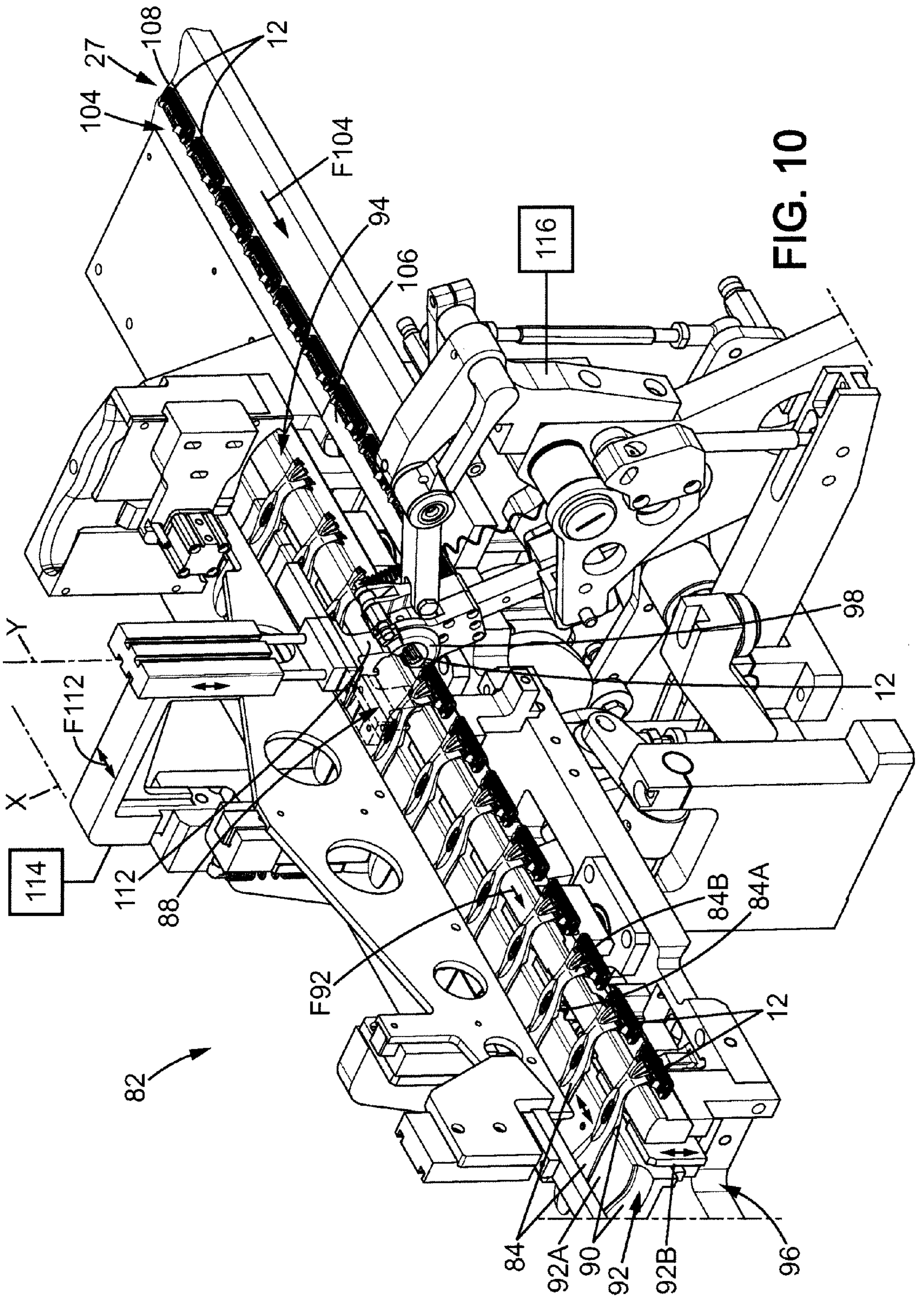
FIG. 10 is a schematic perspective view of the apparatus of FIG. 9 in another position.

The mounting station 82 further comprises a cradle 98 movable and controlled between a receiving position in a cradle receiving zone 100 as depicted on FIG. 9 in which the cradle 98 is adapted to receive a razor cartridge and a connecting position located in the connecting zone 88 as depicted on FIG. 10 in which the cradle 98 allows the shaving cartridge 12 carried by the cradle to be connected onto a razor handle 84.

The apparatus for manufacturing a razor and more specifically the mounting station 82 further includes a cartridge conveyor which can transport the shaving cartridges 12 directly from the release zone 28 near the cradle receiving zone 100. In this case, the cartridge conveyor is the one 29 onto which the shaving cartridge 12 released from the cartridge dispenser 14 are put onto (see FIGS. 1, 5-7). Otherwise, the cartridge conveyor can be a different one 104 as depicted on FIGS. 9-11. The cartridge conveyor 104 is in communication (not illustrated) with the cartridge conveyor 29 for instance in a cartridge arriving zone 27.

The cartridge conveyor 104 can comprise a driving plate 106 movable on a cartridge support 108 and specifically shaped to drag several shaving cartridges 12 together (for instance four as depicted on the figures).

The driving plate 106 is movable in translation along arrow F108 corresponding to the direction of the length of the cartridge conveyor 104 and transversally to arrow F108, along arrow A108 to move closer and away from the shaving cartridges 12 supported on the cartridge support 108. The driving plate 106 has a back and forth motion such that the four shaving cartridges 12 grabbed by the driving plate 106 are transported on the cartridge conveyor 104 along arrow F104 corresponding to the length of the cartridge conveyor 104 in the direction of the cradle receiving zone 100.

Besides, the cradle 98 comprises a ramp 110 (best seen on FIG. 11) such that in the receiving position, the shaving cartridge 12 can slide from the cartridge conveyor 104 on the ramp 110 to be carried by the cradle 98. The cradle 98 is then moved upward in the connecting zone 88 in its connecting position where the shaving cartridge 12 will be dragged from the ramp 110 by the handle 84 which is just in front of it.

To simplify the apparatus, the movement of the handle conveyor 92 (along F92) can be in the same direction F104 of the cartridge conveyor 104 and the ramp 110 provided on the cradle 98 is in alignment with the cartridge conveyor 104. Therefore, when a shaving cartridge 12 arrives on the ramp 110 and is moved upward in the connecting position in the connecting zone 88 it arrives in front of a razor handle 84 in a good position to be connected to the last.

Figure 11:
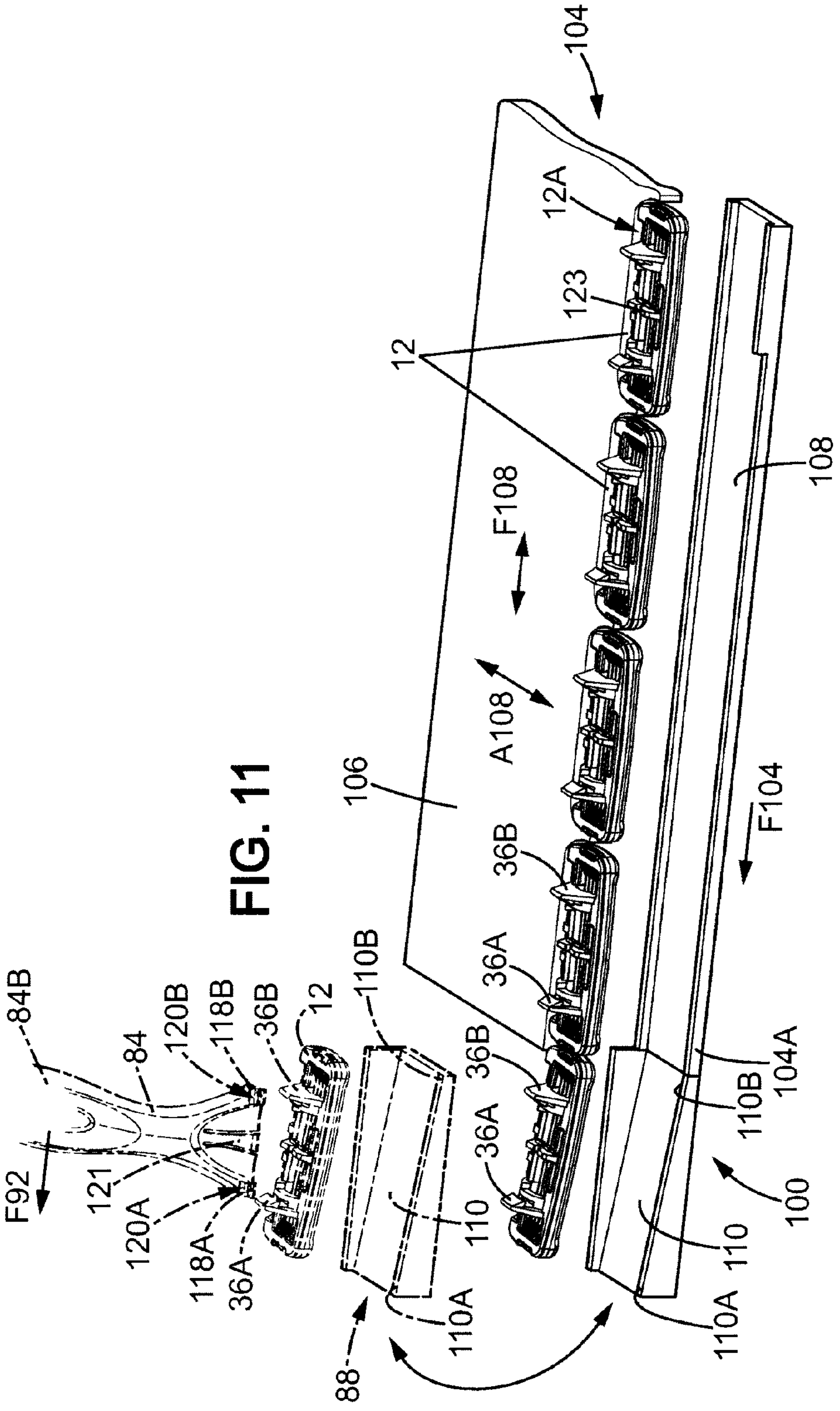
FIG. 11 is a schematic view in elevation of a part of the mounting station.

Besides, as best depicted on FIG. 11, the ramp 110 is inclined between a top 110A and a bottom 110B such that in cradle receiving zone 100 where the cradle 98 is in its receiving position, one of the rearwardly protruding connector 36 of the shaving cartridge 12 is located on the top 110A, whereas the second one is located on the bottom 110B. More precisely, with regard to the displacement along F104 of the shaving cartridge 12 located on the cartridge conveyor 104, each shaving cartridge 12 is provided with a first rearwardly protruding connector 36A which is the forward-most one and a second rearwardly protruding connector 36B which is the rearward-most one.

In its receiving position, the cradle 98 is located such that the bottom 110E of the ramp is just in front of the end 104A of the cartridge conveyor 104, the shaving cartridge 12 being able to slide on the ramp 110 from the bottom 110B up to the top 110B. When the shaving cartridge 12 is in place in the cradle 98, its first rearwardly protruding connector 36A is located on the top 110A of the ramp, whereas its second rearwardly protruding connector 36B is located on the bottom 110B.

Therefore, when the cradle 98 is pivoted upward in the connecting position (in dotted lines on FIG. 11), the first rearwardly protruding connector 36A is again the forward-most one as seen in direction of arrow F92 (parallel to arrow F104) and the second protruding connector 36A is the rearward-most one.

In order to avoid the displacement of the razor handle 84 from its handle support 90 during the connection of the shaving cartridge 12 carried by the cradle 98 the mounting station 82 is further provided with a retaining mechanism 112 adapted to retain a razor handle onto the handle support. The retaining mechanism 112 is adapted to push the razor handle 84 against the handle support 90 to maintain it in its position during the connection to the shaving cartridge 12. Since the meantime the handle conveyor is in motion along arrow F92, the retaining mechanism 112 is adapted to move simultaneously with it at the same speed.

Actually, the retaining mechanism 112 is movable preferably along vertical axis Y between a release position as depicted on FIG. 9 in which it is upward and does not contact any razor handle and a retaining position as depicted on FIG. 10 in which it maintains a pressure on at least a part of the upper face 84B of the razor handle 84 which is located in the connection zone 88.

Besides, the retaining mechanism 112 is also movable along a direction F112 parallel to arrow F92 to follow the movement of the razor handle 84 during its connection to the shaving cartridge 12. Preferably, arrows F104, F92 and F112 are extending along a horizontal axis X, perpendicular to the vertical axis Y.

The retaining mechanism 112 has a back and forth motion such that it can move down to exert a pressure on the razor handle 84, translate with the last during its connection to a shaving cartridge 12 as depicted in dotted lines on FIG. 10, ascend upward and then return back to retain a further razor handle.

The mounting machine further comprises a handle synchronizing mechanism 114 synchronizing the retaining mechanism 112 and the handle conveyor 92 such that the back and forth motion of the retaining mechanism 112 is synchronized with the motion of the razor handle.

Besides, the mounting machine further comprises a cartridge synchronizing mechanism 116 synchronizing the cartridge conveyor 104 and the cradle 98, such that the cradle 98 is in its receiving position when a shaving cartridge 12 arrives in the cradle receiving zone 100.

The cartridge 116 and handle 114 synchronizing mechanisms being synchronized together such that when the cradle 98 arrives in its connecting position, the retaining means 112 maintains a razor handle 84 on the handle support 90 in the connecting zone 88.

The method for manufacturing a razor will now be described.

A cartridge dispenser 14 containing at least one shaving cartridge 12 is provided in a dispenser arriving zone 16. A shaving cartridge 12 is removed from the cartridge dispenser with the first tool 18 and placed in a cartridge release zone 28. The shaving cartridge 12 is further moved from the cartridge release zone 28 to the cartridge arriving zone 27 with the cartridge conveyor 29 of the device 10 for automatically removing a shaving cartridge 12 and then from the cartridge arriving zone 27 further to the connecting zone 88 with cartridge conveyor 104 and the cradle 98 of the mounting machine.

In this connecting zone 88, where a razor handle 84 has been provided, the shaving cartridge 12 is connected onto the razor handle 84 to form a razor 86.

The method for automatically assembling a razor 86 can occur directly after a shaving cartridge has been released from a cartridge dispenser.

A razor handle 84 is provided on the handle support 90 in being transported by the handle conveyor 92 from the handle arriving zone 94 to the connecting zone.

Besides, a shaving cartridge 12 is moved forward on the cartridge conveyor 104 with the motion along arrow F108 of the driving plate 108 from the cartridge arriving zone 27 to the cradle receiving zone 100. The cradle is controlled such that as soon as shaving cartridge 12 arrives in the cradle receiving zone 100, it is in its receiving position, the ramp 110 of the cradle 98 being in front of the shaving cartridge 12. The driving plate 108 returns back and moves forward four other shaving cartridges 12 so that the shaving cartridge 12 located at the end of the cartridge conveyor 104 (in front of the ramp 110) is pushed forward and slides on the ramp 110.

As soon as the shaving cartridge 12 is completely inserted on the cradle 98 it can be carried by the ramp 110; simultaneously, the cradle 98 is pivoted upward in its connecting position such that the shaving cartridge 12 is brought in the connecting zone 88.

The razor handle 84 is provided with two handle connectors, each having a free end to be connected to one of the rearwardly protruding connectors 36A of the shaving cartridge 12. As best depicted on FIG. 11, the razor handle 84 has a free end 118A of a first handle connector 120A which is the forward-most one seen in direction of arrow F92 and a free end 118B of a second handle connector 120B which is the rear-most one.

Thanks to the cartridge 116 and handle 114 synchronizing mechanisms, the shaving cartridge 12 arrives in position in front of a razor handle 84 to be connected together. More precisely, the first rearwardly protruding connectors 36A of the shaving cartridge 12 arrives in front of the free end 118A of the first handle connector 120A provided on a razor handle 84 arriving in the connecting zone 88. Due to the inclined surface of the ramp 110, the first rearwardly protruding connectors 36A is close to the free end 118A, whereas the second rearwardly protruding connectors 36B is much more farther from the free end 118B of the second handle connector 120A.

Figures 12A, 12B, 12C:
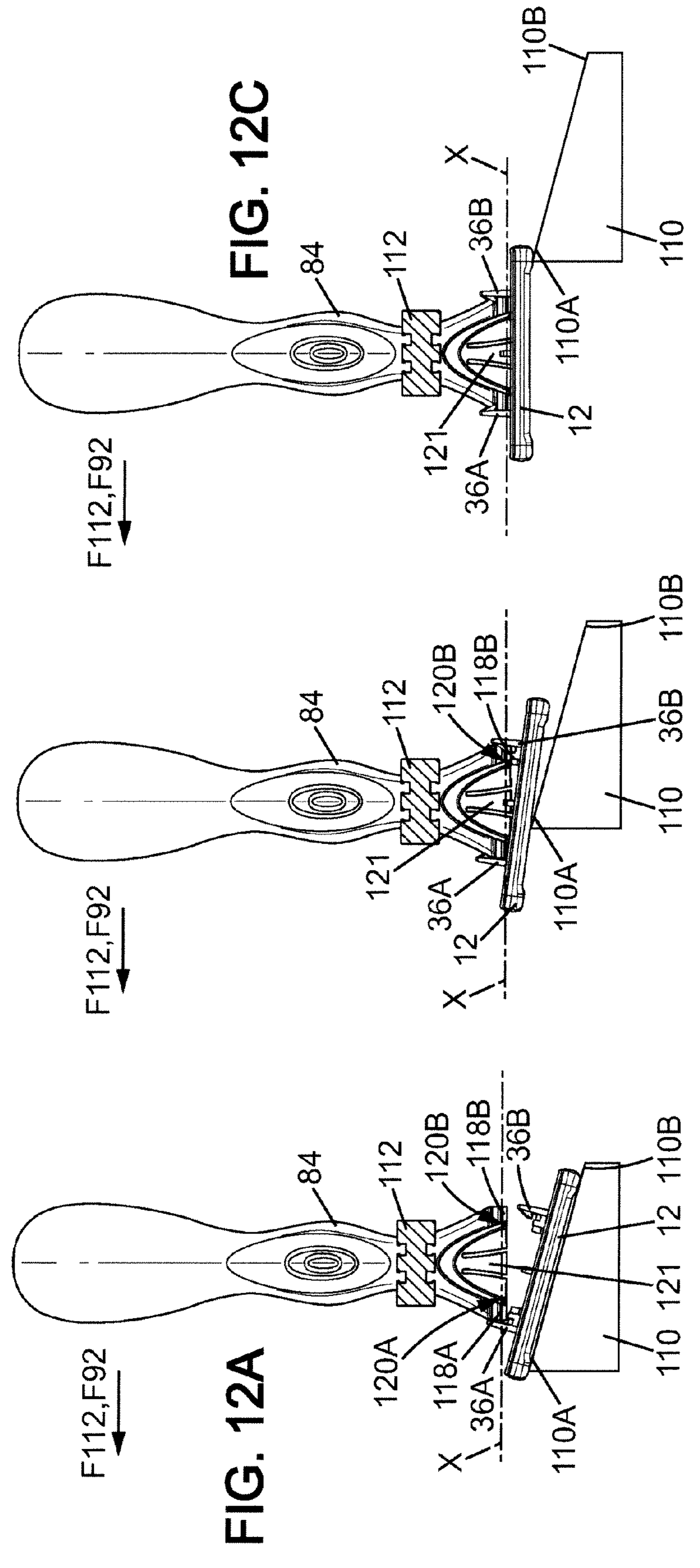
FIGS. 12A, 12B, and 12C are the schematic upper views of the connection of the shaving cartridge onto the razor handle.

Actually, as best seen on FIG. 12A, the shaving cartridge 12 and the razor handle 84 are like intermeshed previous their connection together. This means that the first rearwardly protruding connectors 36A is a little bit shifted forward the free end 118A in the conveyor direction F92. Due to the continuous motion of the handle conveyor 92 along arrow F92, as soon as the free end 118A arrives in front of the first rearwardly protruding connectors 36A it get inserted in the first arcuate slot 36A of the shaving cartridge 12.

As soon as the free end 118A automatically connects the first rearwardly protruding connectors 36A, the razor handle 84 drags the shaving cartridge 12 in direction of arrow F92 since the handle conveyor 92 continue to move, the first rearwardly protruding connectors 36A leaving the top 110A of the ramp 110. As a consequence, the shaving cartridge 12 slides on the ramp and the second rearwardly protruding connectors 36 approaches the top 110A of the ramp 110 as illustrated on FIG. 12B while coming closer and closer to the free end 118B of a second handle connector 120B.

As soon as the second rearwardly protruding connectors 36 arrives at the top 110A of the ramp 110 it is automatically snap-pressed against the free end 118B of a second handle connector 120B which has continue to move forward along F92 as illustrated on FIG. 12C. A razor 86 is then obtained and is transported on the handle conveyor 94 from the connecting zone 88 to a receiving zone 96 as depicted on FIGS. 9-10. This manner of connecting the shaving cartridge 12 on a razor handle which is continuously translated is called a connection on the fly.

Figure 13:
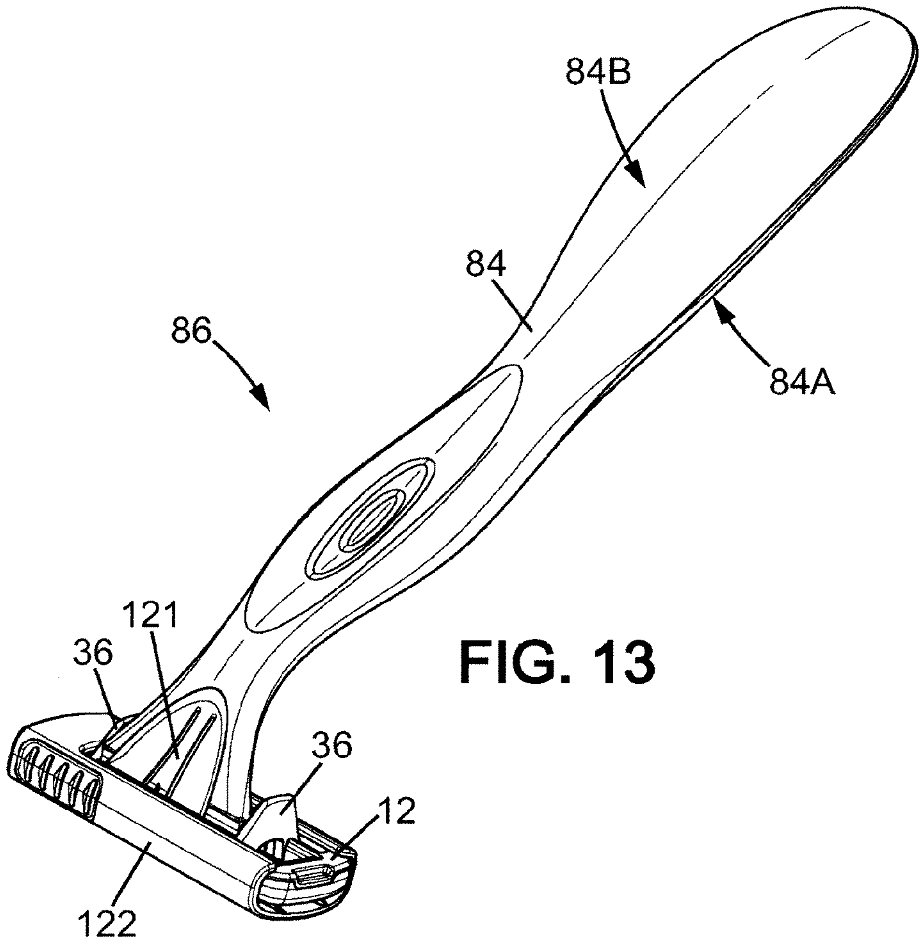
FIG. 13 is a perspective view of a razor.

As depicted on FIG. 13, the razor 86 may be a disposable one, meaning that the shaving head 12 and the razor handle 84 have to be throwing away when the shaving cartridge edges of the shaving head 12 are dulled. During the connection of the shaving cartridge 12 onto the razor handle 84, this elastic tongue slides in the corresponding recess 123 provided on the rear face 12A of the shaving cartridge 12.

The razor handle 84 can also be provided with an elastic tongue 121 extending between the two razor connectors 120A and 120B. This elastic tongue 121 allows the shaving cartridge 12 to return back to its at-rest position when the shaving forces stop.

Besides, the razor 84 can be further provided with a protective cover 122 which can be slid on the shaving cartridge 12 to protect the cartridge edges (not illustrated). The apparatus can therefore be further provided with a cover mounting station (not illustrated) for automatically assembling a cover 122 on a razor which has just been assembled to avoid any contamination of the cartridges. Thus, this cover mounting station can be located just at the end of the mounting station 82 for automatically assembling a razor.

The invention claimed is:

1. A method for automatically assembling a razor comprising a shaving cartridge and a razor handle, the shaving cartridge having first and second rearwardly protruding connectors and the razor handle having first and second handle connectors having free ends adapted to be connected respectively to the rearwardly protruding connectors, the method comprising:

a handle providing step wherein the razor handle is provided, a cartridge providing step wherein the shaving cartridge is provided, a first connecting step wherein the first rearwardly protruding connector of the shaving cartridge is automatically connected to the free end of the first handle connector of the razor handle, after the first connecting step, a second connecting step wherein the second rearwardly protruding connector of the shaving cartridge is automatically connected to the free end of the second handle connector of the razor handle, thereby forming a razor, and wherein the first rearwardly protruding connector remains connected to the free end of the first handle connector at least until the second connecting step.

2. The method according to claim 1, wherein during the second connecting step the second rearwardly protruding connector of the shaving cartridge is snap-pressed against the free end of the second handle connector of the razor handle.

3. The method according to claim 2, wherein:

during the handle providing step, the razor handle is transported from a handle arriving zone where the razor handle is provided to a connecting zone where the two rearwardly protruding connectors of the shaving cartridge are connected to the free ends of the razor handle, during the cartridge providing step, the shaving cartridge is transported from a cartridge arriving zone where the shaving cartridge is provided to the connecting zone, and the method further comprises a razor transporting step wherein, after the second connecting step, the razor is transported from the connecting zone to a receiving zone.

4. The method according to claim 2, further comprising a dragging step occurring between the first and second connecting steps and during which the razor handle slidingly drags the shaving cartridge, the razor handle being slid from the first connecting step to the second connecting step.

5. The method according to claim 1, wherein:

during the handle providing step, the razor handle is transported from a handle arriving zone where the razor handle is provided to a connecting zone where the two rearwardly protruding connectors of the shaving cartridge are connected to the free ends of the razor handle, during the cartridge providing step, the shaving cartridge is transported from a cartridge arriving zone where the shaving cartridge is provided to the connecting zone, and the method further comprises a razor transporting step wherein, after the second connecting step, the razor is transported from the connecting zone to a receiving zone.

6. The method according to claim 5, further comprising a dragging step occurring between the first and second connecting steps and during which the razor handle slidingly drags the shaving cartridge, the razor handle being slid from the first connecting step to the second connecting step.

7. The method according to claim 1, further comprising a dragging step occurring between the first and second connecting steps and during which the razor handle slidingly drags the shaving cartridge, the razor handle being slid from the first connecting step to the second connecting step.

* * * * *